US008353247B2

(12) United States Patent
Jung et al.

(10) Patent No.: US 8,353,247 B2
(45) Date of Patent: Jan. 15, 2013

(54) GAS GENERATOR

(75) Inventors: Christian Jung, Muehldorf (DE); Thomas Kapfelsperger, Muehldorf (DE)

(73) Assignee: TRW Airbag Systems GmbH, Aschau am Inn (DE)

( * ) Notice: Subject to any disclaimer, the term of this patent is extended or adjusted under 35 U.S.C. 154(b) by 69 days.

(21) Appl. No.: 12/747,204

(22) PCT Filed: Dec. 9, 2008

(86) PCT No.: PCT/EP2008/010441
§ 371 (c)(1),
(2), (4) Date: Jun. 10, 2010

(87) PCT Pub. No.: WO2009/077109
PCT Pub. Date: Jun. 25, 2009

(65) Prior Publication Data
US 2010/0269726 A1 Oct. 28, 2010

(30) Foreign Application Priority Data
Dec. 14, 2007 (DE) .......................... 10 2007 060 265

(51) Int. Cl.
*C06D 5/00* (2006.01)
(52) U.S. Cl. ....................................... 102/530; 280/736
(58) Field of Classification Search .................. 102/530, 102/531, 202.14, 202.12, 200, 202; 280/736, 280/740, 741, 742, 737
See application file for complete search history.

(56) References Cited

U.S. PATENT DOCUMENTS

| 4,998,750 | A | * | 3/1991 | Werner et al. ................. 280/740 |
| 5,456,492 | A | | 10/1995 | Smith et al. |
| 5,462,307 | A | * | 10/1995 | Webber et al. ................. 280/737 |
| 5,643,345 | A | * | 7/1997 | Cox et al. ..................... 55/385.3 |
| 5,799,969 | A | * | 9/1998 | Coleman et al. ........... 280/728.2 |
| 7,293,797 | B2 | * | 11/2007 | Nakayasu et al. ............ 280/737 |
| 7,597,348 | B2 | * | 10/2009 | Fukuda et al. ............. 280/730.2 |

(Continued)

FOREIGN PATENT DOCUMENTS

DE 197 53 811 A1 6/1998
(Continued)

*Primary Examiner* — Bret Hayes
*Assistant Examiner* — Reginald Tillman, Jr.
(74) *Attorney, Agent, or Firm* — Tarolli, Sundheim, Covell & Tummino LLP

(57) ABSTRACT

An inflator has an elongate outer housing (110) which has at least one discharge opening (126) and which contains a compressed gas container (112) and an igniting unit (116) provided at a first axial end (114) of the compressed gas container (112). The igniting of said igniting unit generates a shock wave which, in a shock wave direction (S), enters the compressed gas container (112) at the first axial end thereof and which passes at least through some sections of the compressed gas container (112). The discharge opening (126) is arranged away from the first axial end of the compressed gas container (112) and is closed by a bursting membrane (128) which can be destroyed by the shock wave, wherein the bursting membrane (128) is not oriented perpendicularly to the shock wave direction (S). The compressed gas container (112) has a deflecting device (138; 338; 438) which deflects the shock wave running through the compressed gas container (112) from the shock wave direction (S) in the direction of the bursting membrane (128).

11 Claims, 3 Drawing Sheets

U.S. PATENT DOCUMENTS

| | | | |
|---|---|---|---|
| 2004/0094940 A1* | 5/2004 | Hawthorn et al. | 280/736 |
| 2005/0161922 A1* | 7/2005 | Bilbrey et al. | 280/736 |
| 2005/0179240 A1* | 8/2005 | Duvacquier et al. | 280/740 |
| 2006/0103123 A1* | 5/2006 | Myers | 280/736 |
| 2006/0249938 A1* | 11/2006 | Matsuda et al. | 280/736 |
| 2007/0108753 A1 | 5/2007 | Pang et al. | |
| 2007/0176404 A1* | 8/2007 | Yano | 280/737 |

FOREIGN PATENT DOCUMENTS

| | | |
|---|---|---|
| DE | 696 18 911 T2 | 8/2002 |
| DE | 20 2005 008 938 U1 | 9/2005 |
| DE | 10 2004 052 037 A1 | 4/2006 |
| EP | 1 652 739 A2 | 5/2006 |
| WO | WO-01/42047 A2 | 6/2001 |

* cited by examiner

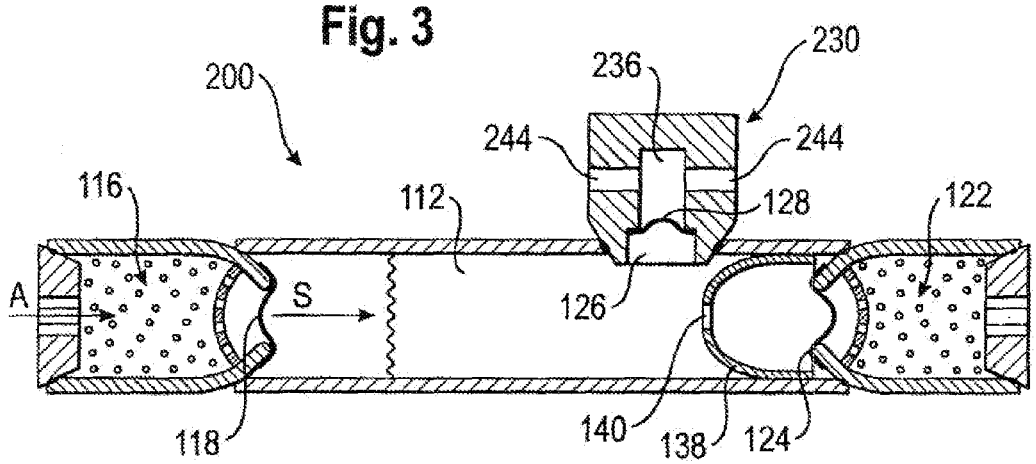
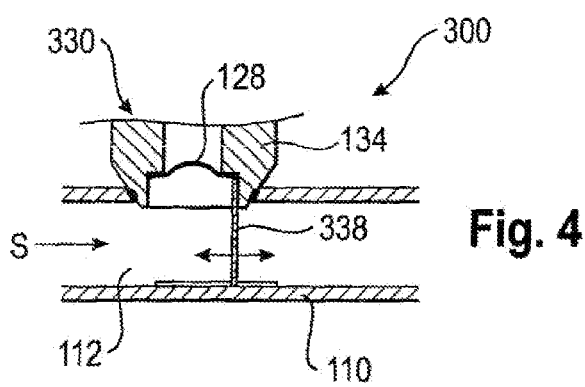
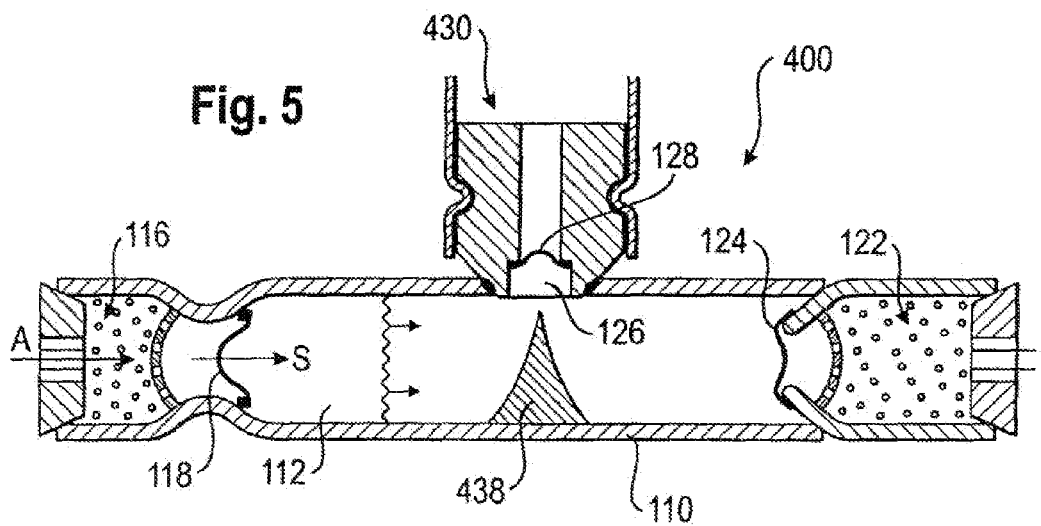

GAS GENERATOR

FIELD OF THE INVENTION

The invention relates to an inflator.

BACKGROUND OF THE INVENTIONS

Inflators in vehicles provide the filling gas required for filling an airbag or else the propellant required to drive a belt retractor. The gas can be generated in the inflator by combustion of solid fuel into a gaseous end product, by releasing compressed gas stored in the inflator, by combustion of compressed gas or by a combination of different of these processes.

For reasons of operational safety it is advantageous to use inert gases in compressed inflators. In this context, above all argon, helium and nitrogen as well as mixtures of said gases are employed.

The inert gas is stored at a pressure of e.g. 500 bars in a compressed gas container which is closed against the ambience by a bursting membrane. The latter is opened upon activation of the inflator so that the gas can be discharged from the inflator.

Upon activation of the inflator, a small pyrotechnical propellant contained in an igniter which releases a particular amount of gas and causes a particular increase in temperature is usually ignited. The increase in temperature can be exploited to heat the compressed gas such that the internal pressure in the compressed gas container exceeds the bursting pressure of the bursting membrane. However, this requires a relatively large amount of pyrotechnical fuel, means a relatively high time delay between igniting the propellant and opening the bursting membrane and, moreover, results in the fact that the discharging gas is very hot and further measures have to be taken to protect the airbag against the hot gases.

A different technology turned out to be advantageous in which the igniter is used to generate a shock wave entering the compressed gas container and running through the same up to the bursting membrane, wherein a local extremely short increase in pressure exceeds the bursting pressure of the bursting membrane only in the area of the shock wave and the wave front thereof and opens the bursting membrane. A shock wave typically runs through the medium at high velocity which may be above sonic velocity. The medium is strongly compressed in the area of the wave front of the shock wave in a spatially closely limited area so that in this area the pressure is strongly increased vis-a-vis the mean pressure of the medium. In this way early opening is effectuated after activation. With this technology, the mean temperature in the compressed gas container until opening is definitely below that of the first described method.

However, this technology at present strongly restricts the geometries usable for the inflator. Moreover, there are problems in using multi-stage inflators in which the amount of gas generated is to be controlled.

SUMMARY OF THE INVENTION

It is the object of the invention to enhance an inflator as regards these items.

In this context, the invention provides an inflator having an elongate outer housing which has at least one discharge opening and which contains a compressed gas container and an igniting unit provided at a first axial end of the compressed gas container, the igniting thereof generating a shock wave which, in a shock wave direction, enters the compressed gas container at the first axial end thereof and which runs at least through some sections of the compressed gas container. The discharge opening is arranged away from the first axial end of the compressed gas container and is closed by a bursting membrane adapted to be destroyed by the shock wave. The bursting membrane is not oriented perpendicularly to the shock wave direction. The compressed gas container has a deflecting device which deflects the shock wave running through the compressed gas container from the shock wave direction in the direction of the bursting membrane.

In this manner, also geometries in which the bursting membrane is not arranged in a way oriented directly linearly to the igniting unit can be realized in the inflator. It is normally required that when making use of the shock wave principle for opening the bursting membrane there are no obstacles between the igniting unit and the bursting membrane which might cause a reflection of the shock wave. However, in accordance with the invention a deflection or reflection of the shock wave is exploited to deflect the latter from its original direction and target it to the bursting membrane.

It is also possible to use additional focusing means for focusing the shock wave to the bursting membrane.

The use of the deflecting device permits, for instance, to dispose the discharge opening sideward of the outer housing, i.e. laterally to the longitudinal axis of the outer housing, and to deflect the shock wave e.g. by 90 so as to direct it to the bursting membrane.

In a possible embodiment the deflecting device is mounted opposite to the discharge opening or opposite to a discharge means at which the discharge opening is arranged to the inside of the compressed gas container and projects into the interior of the compressed gas container. The shock wave running through the compressed gas container impinges on the deflecting device and is deflected by the same. The area directly at the bursting membrane can be spared by the deflecting device so as not to prevent the shock wave from propagating at this point.

It is possible to design the deflecting device so that it is adjacent to the inner wall of the compressed gas container only along about half the circumference. Preferably the deflecting device shows such structure that it has a larger extension in the area of the circumferential wall of the compressed air container than in the area of the bursting membrane.

In accordance with another possible embodiment the deflecting device has a rotation-symmetric design with respect to a longitudinal axis of the inflator. It can be adjacent to the inner wall of the compressed air container along the entire circumference of the compressed air container or along the circumference of the compressed air container except for the area of the bursting membrane.

In these embodiments the cross-section of the compressed air container is partly left blank.

Another possible embodiment provides that the deflecting device extends along the entire cross-section of the compressed air container prior to activation of the inflator.

The bursting membrane closes a primary discharge opening in the wall of the compressed gas container through which the whole gas leaving the inflator is discharged. The bursting membrane may also be disposed in the discharge unit, wherein a passage leading from the primary discharge opening to the bursting membrane is in fluid connection with the compressed gas container and is on the same pressure level as the compressed gas container prior to activation of the inflator.

Preferably a discharge unit exhibiting secondary discharge openings is connected downstream of the bursting membrane. This discharge unit can be in the form of a known diffuser, for example. The orientation and the number of the secondary discharge openings are coordinated with the respective application.

The outer housing preferably has a cylindrical section to which the discharge means is radially attached. The inflator is, for instance, a known elongate tubular inflator as it is used for filling side airbags, passenger airbags or knee airbags. The discharge means can be a nozzle-shaped diffuser, but it can as well serve as a lug for a gas lance or a gas guiding hose.

It has turned out that the maximum pressure of the shock wave can be increased when the inner cross-section of a passage located in the flow direction upstream of the bursting membrane is tapered toward the bursting membrane. The tapering can be in the form of a linearly tapered truncated cone or in the form of a truncated cone having a concave wall curvature.

It is possible to arrange the deflecting device directly opposite to the primary discharge opening. But it can also be located in the area of the rear end, viewed from the igniter in the axial direction, or only shortly behind the primary discharge opening.

The igniting unit is preferably disposed at an axial end of the inflator, as this is known from conventional tubular inflators.

The deflecting device can be designed so that it prevents over igniting to a second igniting unit when the first igniting unit of the inflator is ignited. Such igniting unit is preferably arranged at the second axial end of the inflator.

The deflecting device can be arranged on the side of the second igniting unit, that is downstream of the primary discharge opening viewed from the first igniting unit.

The deflecting device can also be arranged symmetrically, however, so that upon igniting the first igniting unit the second igniting unit is protected, but upon igniting the second igniting unit prior to the first igniting unit the first igniting unit is appropriately protected. Then in both cases the shock wave can be deflected in the direction of the bursting membrane at the discharge opening.

Since the shock wave is laterally deflected completely or at least largely by the deflecting device, the increase in pressure at the second igniting unit is not strong enough to destroy a possibly provided bursting membrane or to cause igniting of the igniting unit.

The second igniting unit may constitute a second stage of the inflator which generates additional filling or propelling gas. Yet it can also be used to heat the residual gas still provided in the compressed gas container. The second igniting unit is preferably ignited in case of need only, when a particularly large amount of filling gas or filling gas of higher temperature is needed, e.g. in the case of cold ambient temperatures.

BRIEF DESCRIPTION OF THE DRAWINGS

Further features and advantages of the invention result from the following description of plural embodiments in connection with the attached drawings, which show:

FIG. 3 is a schematic sectional view of an inflator according, to the invention in a second embodiment;

FIG. 4 is a schematic cut-out from an inflator according to the invention in accordance with a third embodiment;

FIG. 5 is a schematic sectional view of an inflator according invention in accordance with a fourth embodiment.

DETAILED DESCRIPTION OF THE INVENTION

Figure 1:
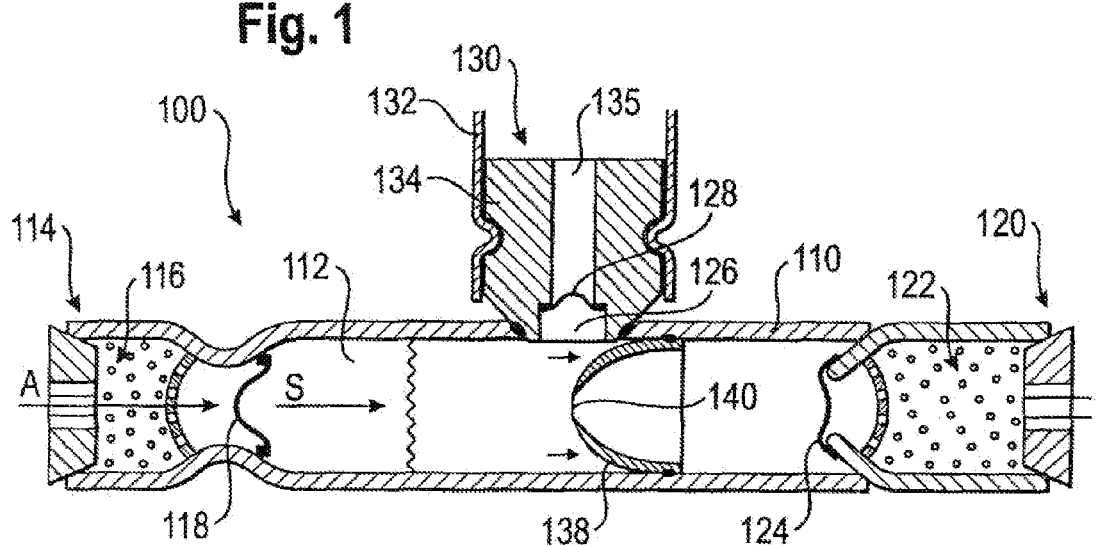
FIG. 1 is a schematic sectional view of an inflator according to the invention in a first embodiment.

The inflator 100 shown in FIG. 1 has an elongate tubular outer housing 110 in which a compressed gas container 112 is formed. The wall of the compressed gas container 112 is formed by the inside of the outer housing 110 and by plural bursting membranes described in detail hereinafter. The compressed gas container 112 is filled with a pressurized gas, preferably an inert gas such as argon, helium, nitrogen or any mixture of said gases. The initial pressure prior to activation of the inflator 100 amounts to 500 bars at 20° C., for instance.

A first igniting unit 116 including a pyrotechnic propellant adapted to be electrically ignited in a known way is arranged at a first axial end 114 of the inflator 100. The igniting unit 116 has a normal atmospheric pressure and is separated, by a first bursting membrane 118, from the compressed gas container 112 connected in the axial direction A of the inflator 100 defined by the outer housing 110 in the area of the first igniting unit 116. On the side of the igniting means of the first bursting membrane 118 another propellant arranged outside of the igniter may be optionally provided.

At the second axial end 120 of the inflator 100 a second igniting unit 122 is arranged which equally includes a pyrotechnic propellant adapted to be electrically ignited in a known way. The second igniting unit 122 is separated from the compressed gas container 112 by a second bursting membrane 124.

In the circumferential wall of the outer housing 110 a primary discharge opening 126 is provided. The discharge opening 126 is closed by a bursting membrane 128 which seals the compressed gas container 112 against the ambience of the inflator 100. A discharge means 130 radially projecting from the outer housing 110 is attached to the outer housing 110 via the discharge opening 126. In the example shown here the discharge means 130 constitutes an axial end of a gas distributing means such as a gas lance or a nozzle for a gas guiding hose. But it could also be in the form of a known diffuser including plural inherent secondary discharge openings.

The discharge means 130 has a guide member 134 including an axial end being pointed in truncated conical form and facing the outer housing 110. The guide member 134 is attached, by said end, to the edge of the opening in the wall of the outer housing 110, e.g. by capacitor discharge welding or any other appropriate technique. Through the guide member 134 extends a passage 136 through which the gas leaves the compressed gas chamber 112 and the inflator 100 after opening the bursting membrane 128.

Upon activation of the inflator 100 the first igniting unit 116 is ignited. Here the pyrotechnic propellant (and the optional further propellant) burns in the igniting unit 116, and the pressure is increased in the chamber ahead of the bursting membrane 118. As soon as the bursting pressure of the bursting membrane 118 is exceeded, the latter abruptly opens and the expansion of the gases released by the first igniting unit 116 in the direction of the compressed gas container 112 generates a shock wave (indicated in the Figures by the wave-shaped line) which enters the compressed gas container 112 in a shock wave direction S. Such shock wave, or the wave front thereof, runs through the compressed gas container 112 until it impinges on a deflecting device 138 and is deflected by the same from its original shock wave direction S. The deflecting device 138 deflects the shock wave in the direction of the bursting membrane 128 at the discharge opening 126. When the deflected shock wave impinges on the bursting membrane 128, it destroys the latter.

Figure 2:
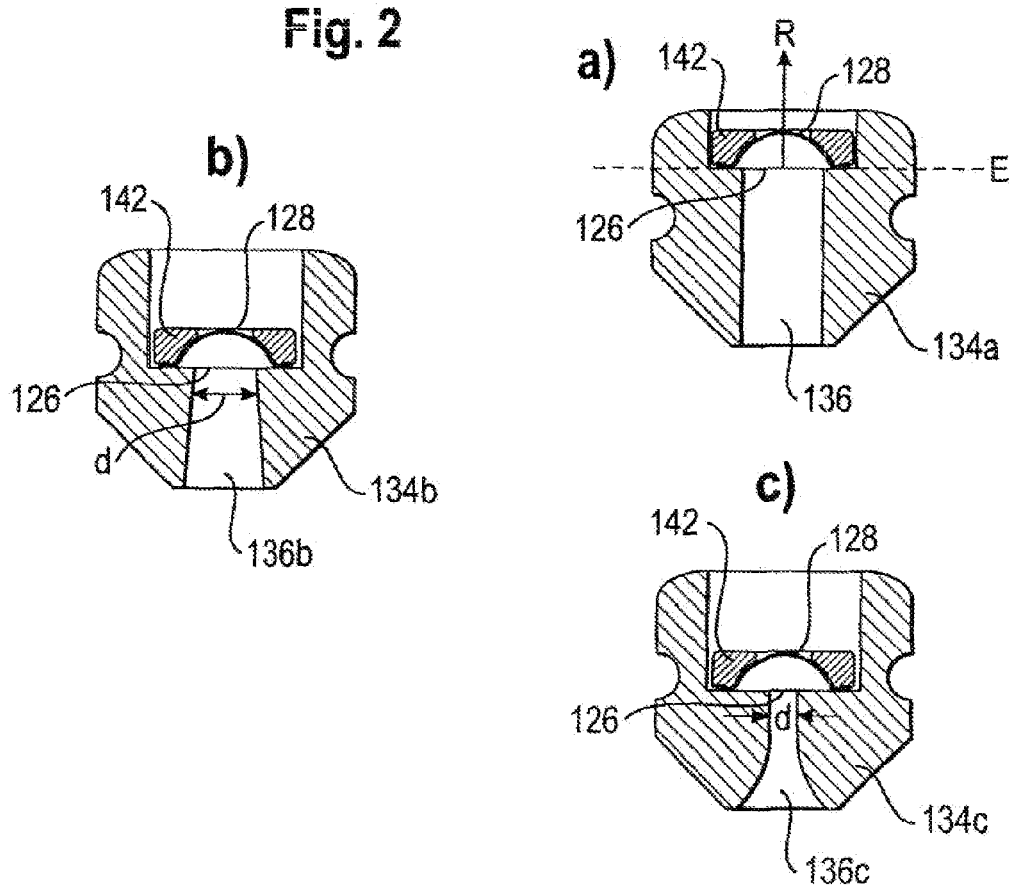
FIGS. 2a to c are various configurations of a discharge means of an inflator according to the invention.

In this example, the deflecting device 138 is a convex sheet metal ring in the form of a truncated cone which is inserted with the tip in the direction of the first igniting unit 116 in parallel to the axial direction A in the compressed gas container 122 and is welded with the inner wall thereof. For securing the deflecting device 138 a corrugation or any other suited structure for preventing the deflecting device 138 from being axially displaced could be provided in the inner wall of the outer housing 110 or, if the compressed gas container 112 is constituted by a separate component, in the wall thereof. The deflecting device 138 spares a small circular passage 140 located in the center of the compressed gas container 112. The shock wave impinging on the deflecting device 138 is reflected by the deflecting device 138 in the upper portion in FIG. 1 and is deflected in the direction of the bursting membrane 128. The bursting membrane 128 more exactly speaking the edge thereof, defines a plane E which is arranged in this case in parallel to the shock wave direction S and also to the axial direction A. The plane E and the primary discharge direction R arranged perpendicularly thereto are indicated in FIG. 2a.

In accordance with the invention, the bursting membrane 128 is not perpendicular to the shock wave direction S, as this used to be necessary before. In this example it is oriented in parallel to the shock wave direction S, the primary discharge direction R extending in radial direction. However; the bursting membrane 128 could also be arranged obliquely in the discharge means 130 so as to receive the reflected shock wave in a particularly favorable direction. In any case, the bursting membrane 128 is located sideward of the shock wave direction S.

The deflecting device 138 is arranged in the compressed gas container 112 such that its tip is disposed exactly below the primary discharge opening 126, i.e. in extension of the passage 135.

Also the gas provided in the rear portion between the deflecting device 138 and the second igniting unit 122 is discharged through the opening 140 from the compressed gas container 112 through the discharge means 130.

The second igniting unit 122 and especially its bursting membrane 124 are efficiently protected against the shock wave by the deflecting device 138. Consequently, there is no risk of inadvertent over-igniting to the second igniting unit 122.

The second igniting unit 122 can be ignited as a second stage of the inflator 100 in case that more filling gas or a filling gas of higher temperature is required. The second igniting unit 122 can be used to heat the gas still remaining in the compressed gas container 112 after the shock wave has opened the bursting membrane 128.

In the embodiment illustrated in FIG. 1 the bursting membrane 128 is arranged in direct vicinity of the primary discharge opening 126 in the outer wall 110 of the inflator 100. The passage 136 is thus provided at ambient pressure prior to activation of the inflator 100.

In the variant shown in FIG. 2a (only the guide member 134a is represented, the residual inflator corresponds to that of the first embodiment) the bursting membrane 128 is arranged away from the circumferential wall of the outer housing 110 at the discharge opening 126 at the upper (in FIG. 2a) end of the guide member 134a. In order to safely attach it to the guide member 134a, an additional annular holding member 142 is provided which seizes the edge of the bursting membrane 228 and is welded with the guide member 134a. Prior to activation of the inflator 100, the passage 136 in this case is provided at the pressure prevailing in the compressed gas container 112. Consequently, the passage 136 in this case is arranged in the direction of flow upstream of the bursting membrane 128 but downstream of the opening in the wall of the outer housing 110.

FIG. 2b shows a variant in which the passage 136b is conically tapered from the discharge opening 126 to the bursting membrane 128. The tapering is linear so that the passage 138b (or the outer wall) has the shape of a straight truncated cone.

FIG. 2c illustrates a variant in which the passage 136c is not linearly tapered but the wall of the passage 136c adopts a convex shape. The cross-section of the passage 136c is definitely smaller at its end on the side of the bursting membrane than at its end on the side of the circumferential wall. This applies both to the embodiment according to FIG. 2b and to that according to FIG. 2c. Here the cross-section d in the variant shown in FIG. 2c is even definitely smaller in the area of the bursting membrane 128, however, than in the embodiment shown in FIG. 2b.

FIG. 3 shows a second embodiment. Already known, unvaried or substantially unvaried components retain their afore-introduced reference numerals.

In the inflator 200 shown here the discharge means 230 is offset in axial direction A very far in the direction of the second igniting unit 122. The deflecting device 138 is directly axially connected to the second igniting unit 122. The end of the deflecting device 138 facing the first igniting unit 116 is offset vis-a-vis the discharge opening 126 so that it is located shortly behind the discharge opening 126 viewed from the first igniting unit 116. As in the case of the first embodiment, upon igniting the first igniting unit 116 a shock wave is generated which enters the compressed gas container 112 in the shock wave direction S. The shock wave is deflected by the deflecting device 138 and destroys the bursting membrane 128 which closes the discharge opening 126.

The discharge means 230, in this case in the form of a diffuser, includes plural secondary discharge openings 244 which are oriented perpendicularly to the radial direction. The passage 236 is closed in this case at its upper end. Here, too, the primary discharge direction R is defined, however, by the plane defined by the bursting membrane 128 analogously to the first embodiment.

In the third embodiment illustrated in FIG. 4, the deflecting device 338 is designed so that it completely closes the cross-section of the compressed gas container 112 prior to activation of the inflator. In the example shown here it is in the form of a flat disk, is inserted perpendicularly to the outer housing 110 in the latter and is mounted non-detachably to the inner wall of the outer housing 110. The exact position of the deflecting device 338 can be determined by those skilled in the art depending on the exact geometry of the inflator 300. After assembly of the inflator 300, the deflecting device 338 does no longer vary its position.

If the first igniting unit 11 (not shown here but located at the left-hand end of the inflator 300) is activated, the shock wave extending in the shock wave direction S impinges on the deflecting device 338 and is deflected by the latter in the direction of the bursting membrane 128 which is destroyed by the sudden local increase in pressure. Moreover, also the deflecting means 338 is destroyed so that an opening is provided to the right-hand portion in FIG. 4 of the compressed gas container 112 through which opening the residual gas can be discharged from the compressed gas container 112.

The inflator 400 shown in FIG. 5 corresponds, apart from the shape of the deflecting device 438, to the inflator 100 of the first embodiment.

The deflecting device 438 is wedge-shaped in cross-section and is mounted opposite to the discharge means 430 at the inner wall of the outer housing 110 which at the same time forms the inner wall of the compressed gas container 112. The deflecting device 438 does not extend over the entire inner circumferential wall but merely in the area opposite to the discharge opening 126. As illustrated here, it can be a massive component having a broad basis facing the wall and a narrowly tapered tip directed into the compressed gas container 112. The side faces of the deflecting device 438 projecting into the compressed gas container 112 are concavely curved so as to obtain a more targeted deflection of the shock wave from the shock wave direction S in the direction of the discharge opening 126 and of the bursting membrane 128.

In the shown example the deflecting device 438 is arranged directly below the discharge opening 126 so that a symmetric arrangement with respect to the two igniting means 116, 122 is formed. The discharge means 430 is arranged approximately in the axial center of the inflator 400. In this case it would be possible to ignite the first igniting unit 116 in the first place as well as to ignite the second igniting unit 122 in the first place. In both events, a shock wave would start to run from the respective igniting unit 116, 122, would be deflected by the deflecting device 438 and would destroy the bursting membrane 128 without opening the opposite bursting membrane 118 or 124.

As a matter of course, it is also possible to choose an arrangement as shown in FIG. 3 and to offset the deflecting means and the discharge opening or discharge unit 430 more closely to the first or second igniting unit 116, 122. Also, the deflecting device 438 could be offset vis-a-vis the discharge opening 126.

Of course, also another variant can be used for the discharge means 430, e.g. the diffuser described in the preceding example of FIG. 3 or any of the variants from FIGS. 2a to 2c. Those skilled in the art also have further alternatives, as a matter of course, which they can use and modify in accordance with the desired application. Equally, all features of all shown embodiments can be combined with one another or exchanged for one another at the discretion of those skilled in the art.

The deflecting device could also be formed by an appropriate curvature of the outer housing of the inflator. For this purpose, the wall could be inwardly folded into the interior of the compressed gas container vis-a-vis the primary discharge opening, for instance.

The discharge unit can also be employed for filling the compressed gas container 112. In this case, the design according to FIGS. 2a to 2c suggests itself, wherein the holding member 142 and the bursting membrane 128 are applied after filling so as to close the compressed gas container 112.

In all cases the discharge opening 126 is not arranged directly in the area of the first igniting unit 116 but axially thereof and away from the axial end of the compressed gas container 112 facing the igniting unit 116 as well as sideward of the first igniting unit 116.

In all embodiments shown the discharge means 130-430 and the discharge opening 126 are arranged in a linearly extending, cylindrical section of the outer housing 110. However, this is not necessarily the case, as a matter of course, just as little as the geometry of the inflator is restricted to the form shown here.

Figure 6:
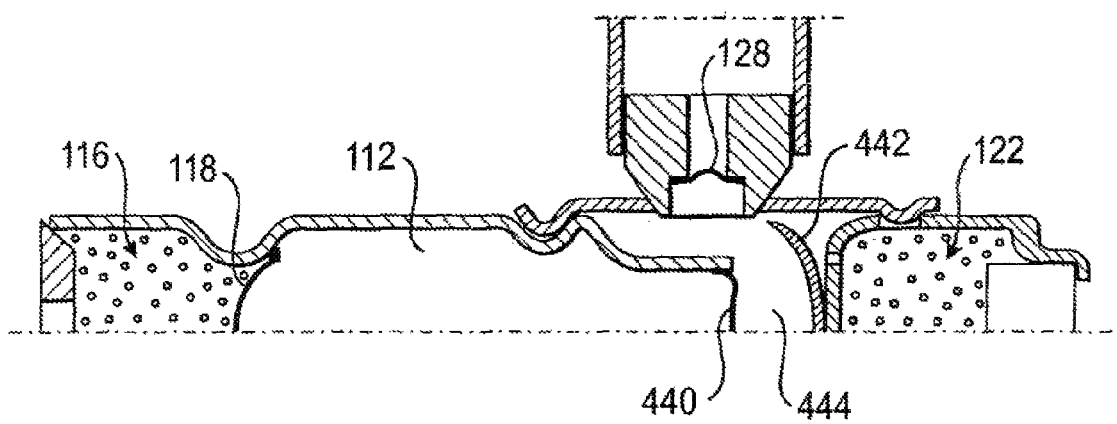
FIG. 6 is a schematic sectional view of an inflator according to the invention in accordance with a fifth embodiment.

In the embodiment according to FIG. 6 the compressed gas container 112 is separated from the bursting membrane 128 by an inner membrane 440. Accordingly, the deflecting device 442 is disposed outside of the compressed gas container 112.

The shock wave running through the compressed gas container 112 or another shock wave impinges, after destruction of the membrane 440, on the deflecting device 442 in a second pressure chamber 444 closed by the bursting membrane 128.

The deflecting device 442 directs the shock wave against the bursting membrane 128 so that the latter is opened. The second igniting unit 122 can be ignited due to the position of the deflecting device 442 irrespective of the first igniting unit 116.

The invention claimed is:

1. An inflator comprising:
an elongate outer housing (110) which has at least one discharge opening (128) and includes a compressed gas container (112) and an igniting unit (116) provided at a first axial end (114) of the compressed gas container (112), the igniting of the igniting unit generating a shock wave which, in a shock wave direction (S), enters the compressed gas container (112) at the first axial end thereof and passes at least through some sections of the compressed gas container (112),
wherein the discharge opening (126) is arranged away from the first axial end of the compressed gas container (112) and is closed by a bursting membrane (128) adapted to be destroyed by the shock wave, wherein the bursting membrane (128) is not oriented perpendicularly to the shock wave direction (S), and
the compressed gas container (112) has a deflecting device (138; 338; 438) which deflects the shock wave running through the compressed gas container (112) from the shock wave direction (S) in the direction of the bursting membrane (128).

2. An inflator according to claim 1, wherein the deflecting device (338; 438) is mounted to the inside of the compressed gas container (112) opposite to the discharge opening (126) and projects into the interior of the compressed gas container (112).

3. An inflator according to claim 2, wherein the deflecting device (438) is adjacent to the inner wall of the compressed gas container (112) only along approximately half of the circumference.

4. An inflator according to claim 1, wherein the deflecting device (138) has a rotation-symmetric design with respect to a longitudinal axis (A) of the inflator (100; 200).

5. An inflator according to claim 1, wherein the deflecting device (338) extends along the entire cross-section of the compressed gas container (112) prior to activation of the inflator (300).

6. An inflator according to claim 1, wherein a discharge means (130; 230; 330; 430) having a secondary discharge opening (126) is connected downstream of the bursting membrane (128).

7. An inflator according to claim 6, wherein the outer housing (110) includes a cylindrical section to which the discharge means (130; 230; 330; 430) is radially attached.

8. An inflator according to claim 6, wherein the inner cross-section of a passage (136b; 136c) formed in the discharge means and located upstream of the bursting membrane (128) in the flow direction is tapered toward the bursting membrane (128).

9. An inflator according to claim 1, wherein the deflecting device (138; 438) is arranged directly opposite to the discharge opening (126).

10. An inflator according to claim 1, wherein the igniting unit (116) is arranged at an axial end (114) of the inflator (100; 200; 300; 400).

11. An inflator according to claim 1, wherein the deflecting device (138; 238; 338; 438) is formed such that it prevents over-igniting to a second igniting unit (122) when the first igniting unit (116) of the inflator (100; 200; 300; 400) is ignited.

* * * * *